United States Patent
Thanu et al.

(10) Patent No.: US 10,133,721 B2
(45) Date of Patent: Nov. 20, 2018

(54) COLLAPSING DATA CELLS IN ONE OR MORE REPORTS IN A SPREADSHEET

(71) Applicant: MICROSOFT TECHNOLOGY LICENSING, LLC, Redmond, WA (US)

(72) Inventors: Lakshmi N. Thanu, Sammamish, WA (US); Peter Eberhardy, Seattle, WA (US); Dylan Hai Huang, Redmond, WA (US); Xiaohong Mark Yang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 860 days.

(21) Appl. No.: 13/923,189

(22) Filed: Jun. 20, 2013

(65) Prior Publication Data

US 2013/0290823 A1    Oct. 31, 2013

Related U.S. Application Data

(62) Division of application No. 12/843,745, filed on Jul. 26, 2010, now Pat. No. 8,473,837, which is a division
(Continued)

(51) Int. Cl.
*G06F 17/00* (2006.01)
*G06F 17/24* (2006.01)
*G06F 17/21* (2006.01)

(52) U.S. Cl.
CPC .......... *G06F 17/246* (2013.01); *G06F 17/212* (2013.01); *G06F 17/24* (2013.01); *G06F 17/245* (2013.01)

(58) Field of Classification Search
CPC ...... G06F 17/246; G06F 17/245; G06F 17/24; G06F 17/212
See application file for complete search history.

(56) References Cited

U.S. PATENT DOCUMENTS 5,247,611 A * 9/1993 Norden-Paul ......... G06F 17/243
                                                      345/156
5,604,854 A * 2/1997 Glassey ................ G06F 17/246
                                                      345/419
(Continued)

OTHER PUBLICATIONS

"When you attempt to . . . " Last post Nov. 11, 2003. Gogle's text only cache of http://www.experts-exchange.com/Software/Office_Productivity/Office_Suites/MS_Office/Excel/Q_20794031.html. Found at http://74.125.45.104/search?q=cache:5yr8gTL9sFYJ:www.experts-exchange.com/Software/Office_Productivity/Office_Suites/MS_Office/Excel/Q_20794031.html+Q30556.
(Continued)

*Primary Examiner* — Cesar Paula
*Assistant Examiner* — David Faber
(74) *Attorney, Agent, or Firm* — Merchant & Gould

(57) ABSTRACT

Data cells in a spreadsheet report are collapsed and expanded without disrupting other spreadsheet data. A user may want to drill down on data corresponding to a parent member of the report to display more detailed information about the parent member. Likewise, a user may want to drill up the displayed information corresponding to the parent member to hide detailed information associated with the parent member. Before expanding or collapsing a report, the spreadsheet is scanned for information to determine whether the display of other data in the spreadsheet would be disrupted by the expansion/collapse. The information may include cross join information associated with the parent member, the number of child members associated with the parent member, the dimension of the report created by the
(Continued)

parent member and the associated child members, and other reports that may be linked to the report that includes the parent member.

20 Claims, 7 Drawing Sheets

Related U.S. Application Data of application No. 10/987,013, filed on Nov. 12, 2004, now abandoned.

(56) References Cited

U.S. PATENT DOCUMENTS

| | | | | |
|---|---|---|---|---|
| 5,623,591 | A * | 4/1997 | Cseri | G06F 3/0481 715/209 |
| 5,752,253 | A * | 5/1998 | Geymond | G06F 17/246 707/999.002 |
| 5,883,623 | A * | 3/1999 | Cseri | G06F 3/0481 715/209 |
| 7,082,569 | B2 * | 7/2006 | Voshell | G06F 17/246 715/212 |
| 8,473,837 | B2 * | 6/2013 | Thanu | G06F 17/246 715/212 |
| 8,869,020 | B2 * | 10/2014 | Daga | G06F 17/30554 715/212 |
| 2002/0055952 | A1 * | 5/2002 | Clancey | G06F 17/247 715/219 |
| 2002/0169799 | A1 * | 11/2002 | Voshell | G06F 17/246 715/212 |
| 2003/0030672 | A1 * | 2/2003 | Hughes | G06F 17/3064 715/765 |
| 2006/0036955 | A1 * | 2/2006 | Baudisch | G06F 3/0481 715/747 |
| 2006/0085445 | A1 | 4/2006 | Thanu | |
| 2006/0107196 | A1 * | 5/2006 | Thanu | G06F 17/246 715/217 |
| 2007/0050697 | A1 * | 3/2007 | Lewis-Bowen | G06F 17/246 715/212 |

OTHER PUBLICATIONS

"Error message: To prevent possible loss of data, Microsoft Excel cannot shift nonblank cells off the worksheet" Microsoft Help and Support, Article KB305568, Last review Jan. 31, 2007 http://support.microsoft.com/kb/305568.
Office Action dated Oct. 18, 2006, in U.S. Appl. No. 10/987,013.
Office Action dated Jul. 10, 2007, in U.S. Appl. No. 10/987,013.
Office Action dated Apr. 4, 2008, in U.S. Appl. No. 10/987,013.
Office Action dated Sep. 22, 2008, in U.S. Appl. No. 10/987,013.
Office Action dated Apr. 3, 2009, in U.S. Appl. No. 10/987,013.
Office Action dated Jul. 17, 2009, in U.S. Appl. No. 10/987,013.
Office Action dated Jan. 26, 2010, in U.S. Appl. No. 10/987,013.
Microsoft Excel 97/98 Session 2, CAL People and Computer Training, University of California, Berkeley, Sep. 22, 1998, http://calpact.berkeley.edu/info/handouts/PDFarchive/Excel2-97.pdf, 17 pages.
U.S. Appl. No. 12/843,745, Notice of Allowance dated Feb. 27, 2013, 13 pages.

* cited by examiner

400

|  |  | Sales Average | Unit Sales |
|---|---|---|---|
| Canada | Drink |  |  |
|  | Food |  |  |
| Mexico | Drink |  |  |
|  | Food |  |  |
| USA | Drink | 6.12136 | 24597 |
|  | Food | 6.5503337 | 191940 |

410 — USA

450

|  |  | Sales Average | Unit Sales |
|---|---|---|---|
| Canada | Drink |  |  |
|  | Food |  |  |
| Mexico | Drink |  |  |
|  | Food |  |  |
| USA | Drink | 6.12136 | 24597 |
|  | Food | 6.5503337 | 191940 |
| CA | Drink | 6.199581 | 7102 |
|  | Food | 6.56147 | 53656 |
| OR | Drink | 6.21469 | 6106 |
|  | Food | 6.610252 | 48537 |
| WA | Drink | 6.024553 | 11389 |
|  | Food | 6.512026 | 89747 |

460 — CA
470 — OR
480 — WA

COLLAPSING DATA CELLS IN ONE OR MORE REPORTS IN A SPREADSHEET

RELATED APPLICATIONS

This application is a divisional of and claims priority to application Ser. No. 12/843,745, filed Jul. 26, 2010, entitled METHOD FOR EXPANDING AND COLLAPSING DATA CELLS IN A SPREADSHEET REPORT, now U.S. Pat. No. 8,473,837, issued Jun. 25, 2013, which is a divisional of and claims priority to application Ser. No. 10/987,013, (now abandoned), filed Nov. 12, 2004, entitled METHOD FOR EXPANDING AND COLLAPSING DATA CELLS IN A SPREADSHEET REPORT.

BACKGROUND OF THE INVENTION

A spreadsheet is a table of values arranged in rows and columns. Each value can have a predefined relationship to the other values. If one value is changed, other values may also need to be changed. Spreadsheet applications are computer programs that allow for the electronic creation and manipulation of spreadsheets. In a spreadsheet application, each value sits in a data cell. A user may define what type of data is in each cell and how different cells depend on each other. The relationships between cells are called formulas, and the names of the cells are called labels. Data may be entered into the spreadsheet after the cells and the formulas for linking the cells together are defined. Selected values may be modified and other values may change accordingly.

Data may be extracted from one or more files and presented to a spreadsheet application in a specified format. The data may be formatted into a report in rows and columns. A free-form report includes data cells that are each formula-based such that the individual cells may be moved around the spreadsheet without affecting the functionality of the report. A free-form report is not confined to predefined ranges. Extra rows and columns may be inserted into a free-form report to customize the report according to user needs.

A parent cell in a free-form report may have a number of associated descendent (or child) cells. For example, a cell labeled U.S.A. (the parent cell) may be associated with up to fifty child cells (one cell for each state of the union). A user may expand the parent cell to display the associated child cells. A user may also collapse the parent cell such that the child cells are not displayed. The collapsed parent cell may be displayed in the report proximate associated sibling cells (e.g., Canada, China, France). The expansion and collapse of child cells in a free-form report may disrupt other reports or text in the spreadsheet. Furthermore, the expansion of a parent cell to display the associated child cells may extend occupied data cells in the spreadsheet beyond the spreadsheet border since the number of spreadsheet cells is limited (e.g. 65536 rows and 256 columns).

SUMMARY OF THE INVENTION

The present invention is directed to the collapse and expansion of data cells in a spreadsheet report such that the display of data in other areas of the spreadsheet is not disrupted. A report may be expanded by displaying any child members associated with a parent member in the report. The child members may be displayed proximate the parent member. The expanded report may also be collapsed such that the child members associated with the parent member are not displayed in the report. The data integrity of the spreadsheet is preserved by scanning the spreadsheet for information associated with the data cells of the report, and then expanding or collapsing the report based on the information.

A user may want to drill down on data corresponding to the parent member to display more detailed information about the parent member. Likewise, a user may want to drill up the displayed information corresponding to the parent member to hide detailed information associated with the parent member. Before expanding or collapsing a report, the spreadsheet is scanned for information to determine whether other reports or text in the spreadsheet would be disrupted by the expand/collapse operation. The information may include cross-join information associated with the report, the number of child members associated with the parent member, the dimension of the report created by the parent member and the associated child members, and other reports that may be linked to the report that includes the parent member.

The parent member is expanded into a report including the associated child members. The parent member is expanded based on the information obtained by scanning the spreadsheet such that the expansion does not disrupt the display of data cells in other areas of the spreadsheet external to the report. If the spreadsheet area between the vertical borders of the report and the vertical borders of the spreadsheet do not include any occupied data cells, then the rows in the spreadsheet may be replaced with rows that include the child members such that the child members appear in the expanded report without disrupting the integrity of data in the spreadsheet external to the report. If data cells in the spreadsheet area to the left or to the right of the report are occupied with values, but data cells in the spreadsheet area above or below the report are not occupied with values, then the report may be expanded by adding blank ranges of data cells to the report. The child members may then be written to the added data cells. If data cells in the spreadsheet area above or below the report are occupied with values, then the report may only be expanded if the display of the spreadsheet data external to the report is not disrupted by the expansion.

The child members may be collapsed such that only the associated parent member is displayed in the report. The child members are collapsed based on the information obtained by scanning the spreadsheet such that the collapse does not disrupt the display of data cells in other areas of the spreadsheet external to the report. If the data cells are empty in the spreadsheet area to the left and to the right of the report, all of the rows in the report that contain the child members are removed from display in the report. Any occupied spreadsheet data cells that are located below the report may be moved upward to occupy any data cells vacated by the removed child members. If the spreadsheet area between the left border of the report and the left border of the spreadsheet and right border of the report and the right border of the spreadsheet contains at least one occupied data cell but the spreadsheet area between the lower border of the report and the lower border of the spreadsheet does not contain any occupied data cells, the rows containing the child members are removed from the report range such that other data in the spreadsheet area to the right and to the left of the report is not disrupted. If the spreadsheet area between the lower (or upper) border of the report and the lower (or upper) border of the spreadsheet contains occupied data cells, the report may only be collapsed if the display of data in the spreadsheet would not be disrupted. Any remaining members of the report are moved upward as necessary.

DETAILED DESCRIPTION OF THE PREFERRED EMBODIMENT

Data cells in a spreadsheet report are collapsed and expanded without disrupting the display of other spreadsheet data external to the report. A user may want to drill down on data corresponding to a parent member of the report to display more detailed information about the parent member. The more detailed information is presented as child members that include detailed information about the data of the parent member. Likewise, a user may want to drill up the displayed information corresponding to the parent member to hide detailed information associated with the parent member. The expanded report is collapsed such that the child members associated with the parent member are not displayed in the report. Before expanding or collapsing the report, the spreadsheet is scanned for information to determine whether spreadsheet data external to the report would be disrupted by the expansion/collapse. The information may include cross-join information associated with the parent member, the number of child members associated with the parent member, the dimension of the report created by the parent member and the associated child members, and other reports that may be linked to the report that includes the parent member.

Illustrative Operating Environment

Figure 1:
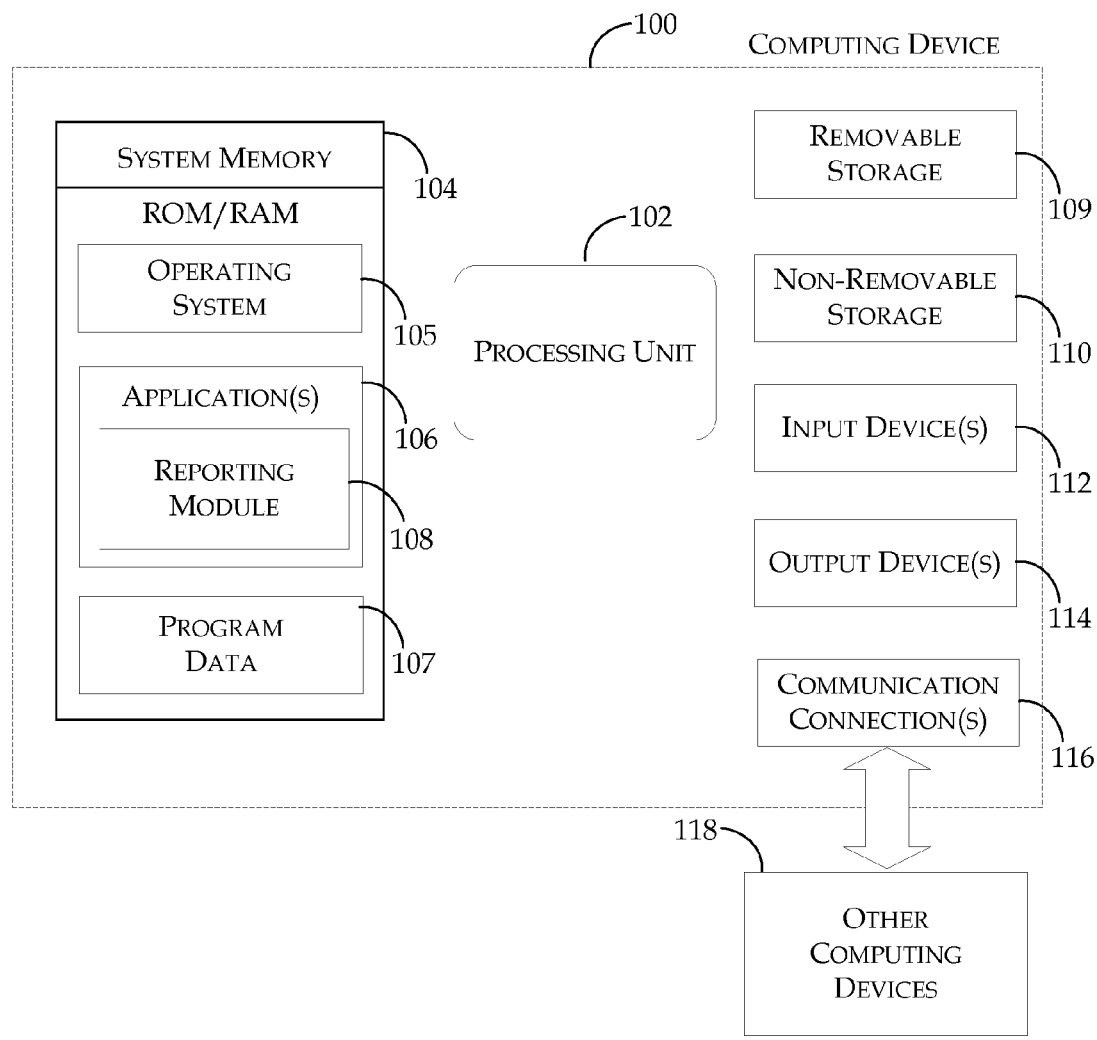
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A reporting module 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Expanding and Collapsing Data Cells in a Spreadsheet Report

Figure 2:
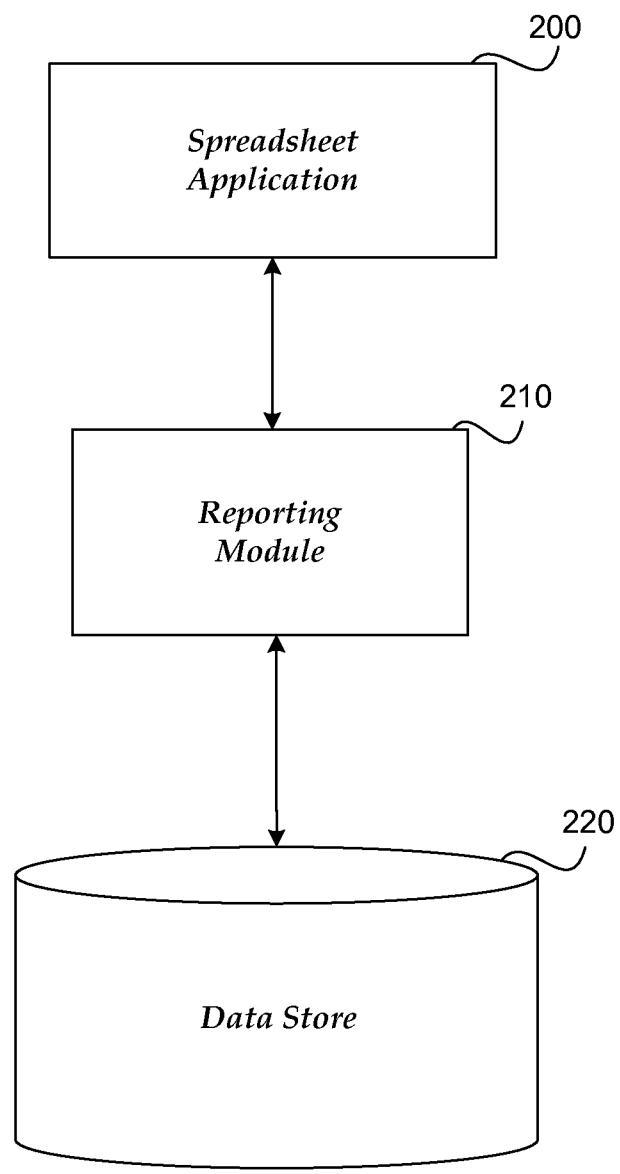
FIG. 2 illustrates a block diagram of a system for expanding and collapsing data cells in a spreadsheet report, in accordance with the present invention.

FIG. 2 illustrates a block diagram of a system for expanding and collapsing data cells in a spreadsheet report. The system includes spreadsheet application 200, reporting module 210, and data store 220. Spreadsheet application 200 may be provided at a client. Data store 220 may be provided at a server. Reporting module 210 communicates with data store 220 to provide data to spreadsheet application 200.

Data in data store 220 may be processed by Online Analytical Processing (OLAP). OLAP is a category of software tools that provides analysis of data stored in a database. OLAP tools enable users to analyze different dimensions of multiple data. For example, OLAP provides time series and trend analysis views. OLAP is often used in data mining. The chief component of OLAP is the OLAP server, which is provided between a client and a database management system. The OLAP server understands how data is organized in the database and has special functions for analyzing the data.

Reporting module 210 may be a program that extracts data from one or more files and presents the information to spreadsheet application 200 in a specified format. Reporting module 210 may format the data into a report in rows and columns. The present invention is directed to the collapse and expansion of data cells in a free-form report using reporting module 210. The processing performed by reporting module 210 is described in detail below.

Figure 3:
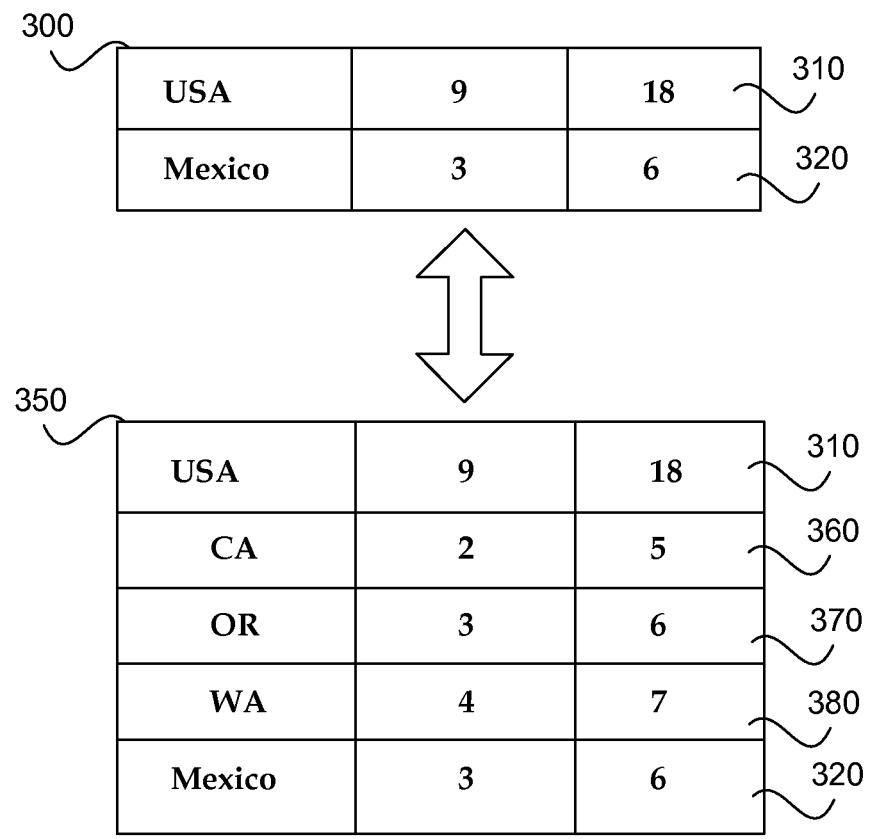
FIG. 3 illustrates the expansion and collapse of data cells in a spreadsheet report, in accordance with the present invention.

FIG. 3 illustrates the expansion and collapse of data cells in a spreadsheet report. The figure shows a collapsed report 300 and an expanded report 350. Collapsed report 300 includes parent members 310 and sibling member 320. A member may be one individual data cell, or a group of related data cells. The group of related data cells may be included within one row, one column, or a data region. A data region may include multiple data cells in adjacent rows and columns. The data region is expanded/collapsed as one entity. As shown in the figure, parent member 310 includes three data cells each occupied with a value (e.g., USA, 9, and 18).

A user may wish to expand parent member 310. In one embodiment, the user may expand parent member 310 by double clicking or right-clicking a mouse anywhere within parent member 310. As shown in expanded report 350, expanding parent member 310 causes child members 360, 370, 380 to be displayed in the report in rows below parent member 310. Sibling member 320 is moved downward to make room for child members 360, 370, 380. In one embodiment, the report is expanded such that the child members appear above the associated parent member. In another embodiment, the parent member may be a column of values such that when the report is expanded, new columns appear in the report proximate the parent member. The new columns may appear proximate the parent member.

Expanded report 350 may be collapsed to form collapsed report 300 by double clicking or right clicking a mouse on any child member 360, 370, 380. Known processes of expanding and collapsing reports may disrupt other data in the spreadsheet that is external to the report. The present invention preserves the integrity of data in the spreadsheet by scanning the spreadsheet for information associated with the parent and child members of the report. The report may then be expanded or collapsed based on the information.

Figure 4:
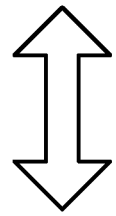
FIG. 4 illustrates the expansion and collapse of data cells in a cross-joined report in a spreadsheet application, in accordance with the present invention.

FIG. 4 illustrates the expansion and collapse of data cells in a cross-joined spreadsheet report. A collapsed report 400 and an expanded report 450 display data from two dimensions that are used in conjunction with each other (i.e., a cross-joined report). For example, sales information related to both food and drink may be combined to form one cross-joined report. A user may expand parent member 410 to reveal child members 460, 470, 480. Likewise, child members 460, 470, 480 in expanded report 450 may be collapsed to form collapsed report 400.

When collapsing or expanding a report, a determination is made about the range of cells to be collapsed/expanded. The spreadsheet is scanned and analyzed to determine if an expansion or collapse operation may be performed without disrupting the display of other data in the spreadsheet. The other data in the spreadsheet may be other reports or text. For example, a determination is made about the existence of empty data cells to the left and to the right of the report. If there are not any occupied data cells on either side of the report, the report may be expanded by replacing the rows of the spreadsheet with the rows that include the child members such that the child members are displayed in the report proximate the parent member without disrupting the display of other spreadsheet data.

However, a spreadsheet may contain so many occupied data cells that some of the occupied data cells are located proximate the spreadsheet border. Since the area of the spreadsheet is limited (e.g. 65536 rows by 256 columns) report expansion may cause spreadsheet data to be pushed off the spreadsheet. For example, a parent member may be expanded such that new columns/rows are added that cause data cells proximate the spreadsheet boundary to expand beyond the boundary. In order to avoid data loss due to overexpansion, a determination is made whether the display of spreadsheet data would be disrupted before a parent member is expanded.

Figure 5:
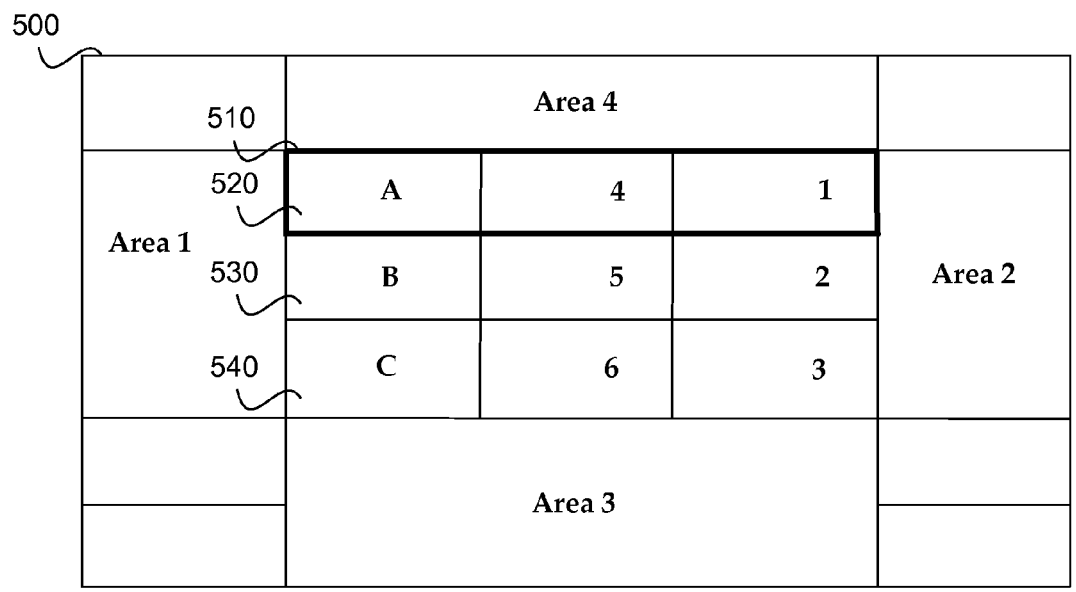
FIG. 5 illustrates how a determination is made to expand or collapse data cells in a spreadsheet report without disrupting other data in the spreadsheet, in accordance with the present invention.
Figure 5:
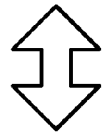
Figure 5:
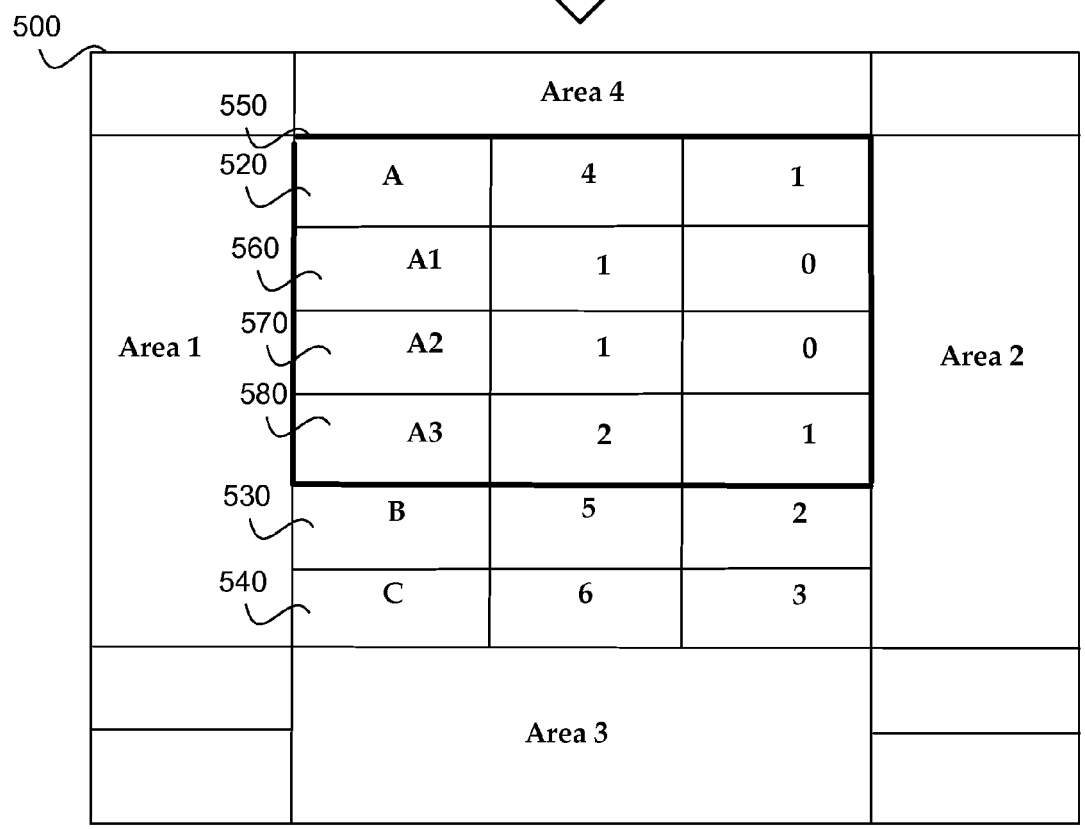

FIG. 5 illustrates how a determination is made to expand or collapse data cells in a spreadsheet report without disrupting other data in the spreadsheet. Spreadsheet 500 includes collapsed report 510 (outlined in bold). Collapsed report 510 includes parent member 520. Parent member 520 may include only one data cell or a group of data cells that form a portion of a row, a portion of a column, or a data region comprised of portions of rows and columns. As shown in the figure, parent member 520 includes a row of three data cells. Sibling members 530, 540 are related to parent member 520 and may be expanded to display associated child members.

A user may request the expansion of parent member 520 by double-clicking or right clicking anywhere on the parent member. Before expanding parent member 520, spreadsheet 500 is scanned for information related to parent member 520 to determine whether the display of other data in spreadsheet 500 would be disrupted by the expansion. Area 1 includes the data cells in spreadsheet 500 between the left border of spreadsheet 500 and the left border of collapsed report 510. Area 2 includes the data cells in spreadsheet 500 between the right border of spreadsheet 500 and the right border of collapsed report 510. Area 3 includes the data cells in spreadsheet 500 between the bottom border of spreadsheet 500 and the bottom border of collapsed report 510. Area 4 includes the data cells in spreadsheet 500 between the top border of spreadsheet 500 and the top border of collapsed report 510.

If none of the data cells in Areas 1 and 2 are occupied with values, the number of rows required for expansion may be added to the spreadsheet proximate parent member 520. Each row includes a child member associated with parent member 520. When the row is added to the spreadsheet, the child members associated with parent member 520 are displayed in the report. As shown in the lower portion of the figure, expanded report 550 includes parent member 520 and child members 560, 570, 580. Sibling members 530, 540 are moved downward into Area 3 to make room for child members 560, 570, 580 which are added directly below parent member 520. In another embodiment, child members 560, 570, 580 may be located above parent member 520. In the case where the parent member is a column, the associated child members may be displayed in columns to the left or the right of the parent member.

If any of the data cells in Areas 1 and 2 are occupied with values and there is a sufficient number of empty data cells in Area 3 such that the expansion of parent member 520 does not disrupt the display of data in Areas 3 and 4, an exact number of rows may be added within the data cell range of the report. For example, as shown in the lower portion of the figure, three rows may be added to create expanded report 550. The added rows correspond to child members 560, 570, 580. Each row added to the report is three data cells long which corresponds to the horizontal data cell range of the report. Thus, the display of data in Areas 1, 2, 3 or 4 is not disrupted by the expansion.

If data cells in each of Areas 1, 2, 3, and 4 are occupied with values, then expansion may only be performed if the expansion does not disrupt the display of data in Areas 3 and 4. For example, a single data member three data cells in length is located in Area 3 at least four data cells above the lower border of the spreadsheet. The display of the data member would not be disrupted by the expansion of collapsed report 500 because the expansion would merely push the data member downward toward the lower border of spreadsheet 500. However, if the data member was located within at least three data cells of the lower border of spreadsheet 500, the expansion of collapsed report 510 would disrupt the display of the data member because the data member would be pushed off spreadsheet 500.

Expanded report 550 may also be collapsed. Expanded report 550 is scanned for information associated with parent member 520 and child members 560, 570, 580. The information is analyzed to determine how the display of related data in other areas of the spreadsheet would be affected by the collapse. The information may include any cross join information and dependencies associated with parent member 520 and child members 560, 570, 580. The information may also include the total number of child members associated with parent member 520. A determination is then made about how to collapse child members 560, 570, 580.

For example, if the data cells in Areas 1 and 2 are empty, then the entire rows where the child members are located may be removed from display in the report, and sibling members 530, 540 may be moved upward proximate parent member 520, as shown in collapsed report 510. If there are any occupied data cells in Areas 1 or 2 and data cells in Areas 3 and 4 are empty, the rows within the report range where the child members are located are removed from the report such that the display of data in Areas 1 and 2 is not disrupted by the collapse. Sibling members 530, 540 may be moved upward proximate parent member 520. If any data cells in Areas 1, 2, 3 and 4 are occupied with values, then collapse may only be performed if the display of data in Areas 3 and 4 would not be disrupted.

Figure 6:
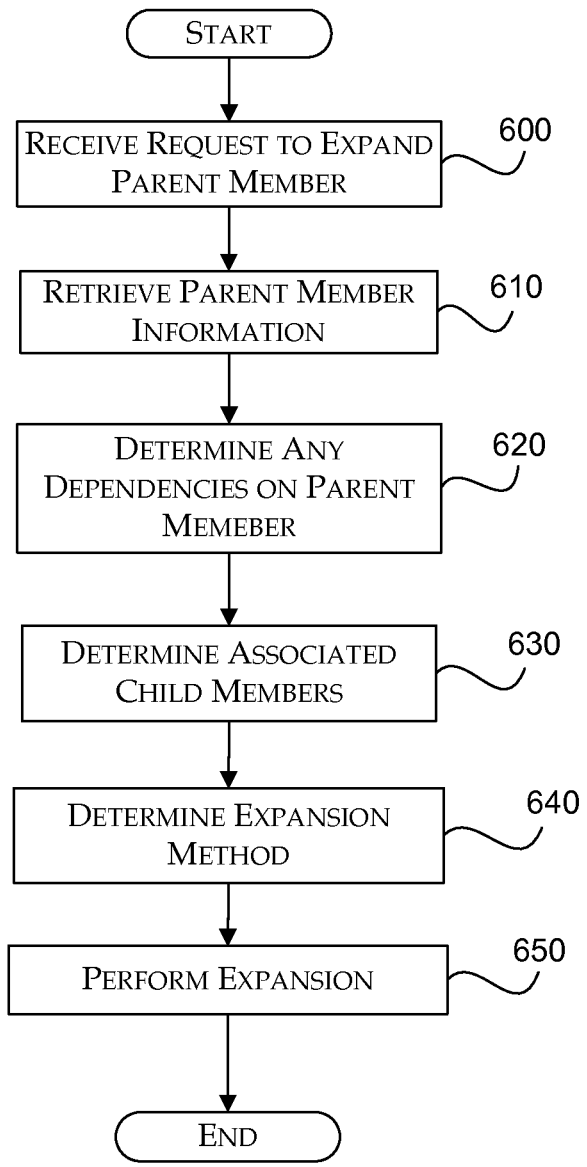
FIG. 6 is an operational flow diagram illustrating a process for expanding data cells in a spreadsheet report, in accordance with the present invention.

FIG. 6 is an operational flow diagram illustrating a process for expanding a parent member in a spreadsheet report. The process begins at a start block where a spreadsheet includes a number of occupied data cells and a report. The report includes at least one parent member. If the parent member is not associated with at least one associated child member, then expansion cannot be performed. The parent member may be a single data cell, or a group of data cells arranged in a row, column, or a data region.

Moving to block 600, a request is received to expand a parent member. Expanding the parent member displays any associated child members in the report in a location proximate the parent member. In one embodiment, the request to expand is submitted by a user. For example, the user may double click or right-click a mouse on the parent member to submit an expand request. The user may want to expand the parent member to display more detailed information associated with the parent member.

Proceeding to block 610, information related to the parent member is retrieved. In one embodiment, the information is a unique member name that is retrieved by scanning the spreadsheet. In another embodiment, the information is retrieved from a data store associated with the spreadsheet. The information retrieved from the data store may include the quantity of child members associated with the parent member, the names of the child members and the dimension of the expanded report created by the parent member and the associated child members.

Advancing to block 620, any dependencies on the parent member are determined by scanning the spreadsheet. In one embodiment, the dependencies may be cross join information associated with the parent member. The cross join information allows the report to display data from two or more dimensions that are used in conjunction with each other. In another embodiment, the dependencies may be other reports that are linked to the parent member. For example, when a parent member is expanded in a first report, an associated parent member may be expanded in a second report that is linked to the first report. All of the data cells that are dependent on the parent member are tallied to determine the total number of data cells that would be displayed upon expansion.

Transitioning to block 630, all of the child members associated with the parent member are determined. If the parent member does not have any associated child members, then expansion is not possible. In one embodiment, the number of child members associated with the parent member is determined by batch. For example, a determination is made whether a group of data cells are all child members. If so, a determination is made whether a next group of data cells are child members. If all of the data cells in the batch are not identified as child members that are associated with the parent member, each data cell is checked individually to determine where the list of child members ends.

Moving to block 640, a determination is made about how to expand the parent member without disrupting the display of data in other areas of the spreadsheet external to the report. If the areas between the vertical borders of the report and the vertical borders of the spreadsheet do not include any occupied data cells, then the rows in the spreadsheet may be replaced with rows that include the child members such that the child members appear in the expanded report without disrupting the display of spreadsheet data. If data cells in the areas to the left or to the right of the report are occupied with values, but data cells in the areas above or below the report are not occupied with values, then the rows within the range of the report may be replaced with the child members. If data cells in the areas above or below the report are occupied with values, then the data cells above or below the report may only be used to expand the report if the display of data in the areas above or below the report is not disrupted by the expansion. If the display of data in the areas above or below the report would be disrupted by the expansion, then the parent member cannot be expanded.

Proceeding to block 650, the expansion is performed. Any sibling members are moved such that the child members may be displayed proximate the parent member. For example, a parent member in a collapsed report is displayed with a sibling member located directly below the parent member. In order to make space for three child members associated with the parent member, the sibling member is moved three rows down, and the three child members are displayed in the three rows below the parent member. The format and formula associated with the parent member is spread to the child members. In one embodiment, the format and formula may be spread across the range of the expanded report in one direction (e.g., horizontally across a row) and then in a different direction (vertically through columns of the report). Any cross join references are also accounted for such that sufficient space is made available to display all of the child members associated with the parent member.

Figure 7:
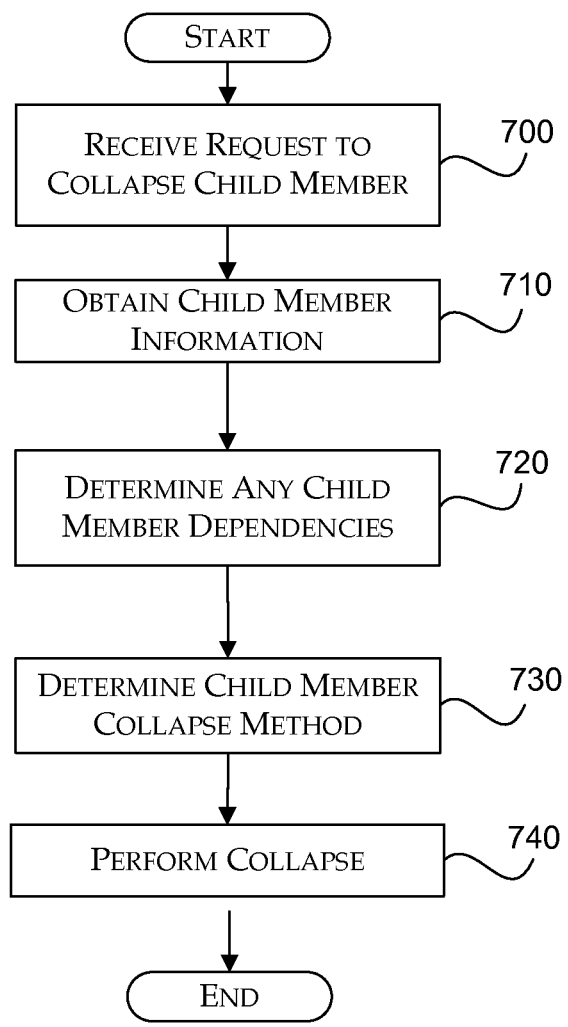
FIG. 7 is an operational flow diagram illustrating a process for collapsing data cells in a spreadsheet report, in accordance with the present invention.

FIG. 7 is an operational flow diagram illustrating a process for collapsing a group of child members in a spreadsheet report. The process begins at a start block where a spreadsheet includes a number of occupied data cells and a report. The report includes a parent member that has at least one associated child member. The parent cell member and the associated child members are displayed in the report.

Moving to block 700, a request is received to collapse a report such that the child members are not displayed in the report. In one embodiment, the request to collapse the report is submitted by a user. For example, the user may submit a collapse request by double clicking or right-clicking a mouse on the report to be collapsed. The user may want to collapse the report to remove detailed information associated with the parent member.

Proceeding to block 710, information related to the child members displayed in the report to be collapsed is obtained. The information may be obtained by scanning the spreadsheet. The information may include the number of parent members and associated child members in the report, and the dimension of the expanded report created by the parent member and the associated child members. The dimension of the expanded report indicates the location of data cells that are not included in the expanded report (i.e., the position where the collapse ends).

Advancing to block 720, any dependencies on the child members are determined. In one embodiment, the dependencies may be cross join information. The expanded report is scanned to determine whether any cross-join information exists. In another embodiment, the dependencies may be other reports that are related to the child members or otherwise linked to the expanded report. For example, when a group of child members is collapsed in one report, an associated group of child members may be collapsed in a linked report. The number of data cells that are dependent on the child members are tallied to determine the spreadsheet area affected by the collapse of the child members.

Moving to block 730, a determination is made about how to collapse the child members of the expanded report. If the data cells are empty in the spreadsheet area to the left and to the right of the report, all of the rows containing the child members are removed from the spreadsheet. Any occupied data cells that are located below the report may be moved upward toward the collapsed report. If the area between the left (or right) border of the report and the left (or right) border of the spreadsheet contains at least one occupied data cell, but the area between the lower (or upper) border of the report and the lower (or upper) border of the spreadsheet does not contain any occupied data cells, the exact number of rows that include the child members are removed from the report range such that the display of data in other areas of the spreadsheet external to the report is not disrupted. If the area between the lower border of the report and the lower border of the spreadsheet contains occupied data cells, the report may only be collapsed if the display of data in other areas of the spreadsheet external to the report is not disrupted. The collapse of the report is then performed at block 740 in accordance with the determined child member collapse method. Processing then terminates at an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for collapsing data cells in one or more reports of a spreadsheet having a limited number of cells, comprising:
   receiving a request to collapse child cells associated with a parent cell of a first report;
   scanning the spreadsheet for information related to the parent cell and the associated child cells including determining when at least one other report is linked to the first report;
   collapsing the child cells in the first report based on the information by preventing the child cells associated with the parent cells from being displayed in the first report without disrupting the layout of data in areas of the spreadsheet external to the first report; and
   collapsing the parent member in the at least one other report when it is determined that the at least one other report is linked to the parent member in the first report.

2. The method of claim 1, wherein the first report comprises a free-form report.

3. The method of claim 1, wherein scanning the spreadsheet for information further comprises scanning the spreadsheet for cross-join information associated with the first report.

4. The method of claim 1, wherein the first report is a cross-joined report that assembles data from a plurality of sources.

5. The method of claim 1, wherein scanning the spreadsheet for information further comprises scanning the spreadsheet for data cells that are dependent on the parent member, a number of child members associated with the parent member, and a dimension of the first report created by the parent member and the associated child members.

6. The method of claim 1, further comprising determining whether a batch of child members is associated with the parent member.

7. The method of claim 1, further comprising copying a format and a formula associated with the parent member to the associated child members.

8. A hardware computer storage medium for collapsing data cells in one or more reports of a spreadsheet having a limited number of cells, comprising:
   receiving a request to collapse child cells associated with a parent cell of a first report;
   scanning the spreadsheet for information related to the parent cell and the associated child cells including determining when at least one other report is linked to the first report; and
   collapsing the child cells in the first report based on the information by preventing the child cells associated with the parent cells from being displayed in the first report without disrupting the layout of data in areas of the spreadsheet external to the first report; and
   collapsing the parent member in the at least one other report when it is determined that the at least one other report is linked to the parent member in the first report.

9. The hardware computer storage medium of claim 8, wherein collapsing the child cells comprises removing a row containing a child cell from the spreadsheet.

10. The hardware computer storage medium of claim 8, wherein collapsing the child cells comprises removing a row containing a child cell from the first report.

11. The hardware computer storage medium of claim 8, wherein collapsing the child cells comprises moving a row containing a sibling cell to be proximate a row containing the parent cell.

12. The hardware computer storage medium of claim 8, wherein collapsing the child cells comprises at least one of: removing a column containing a child cell from the spreadsheet; removing a column containing a child cell from the first report, or moving a column containing a sibling cell to be proximate a column containing the parent cell.

13. The hardware computer storage medium of claim 8, wherein the information comprises at least one of: a total number of data cells in the first report; a dimension of the first report; data cells in the first report that are dependent on other data cells external to the first report within the spreadsheet, or cross-join information associated with the first report.

14. The hardware computer storage medium of claim 8, wherein the information comprises data cells in the first report that are dependent on other data cells external to the first report within the spreadsheet and cross-join information associated with the first report.

15. A system for collapsing data cells in one or more reports of a spreadsheet having a limited number of cells, comprising:
 a processing unit and a computer storage medium;
 an application configured to perform actions using the processor, comprising:
  receiving a request to collapse child cells associated with a parent cell of a first report;
  scanning the spreadsheet for information related to the parent cell and the associated child cells including determining when at least one other report is linked to the first report;
  collapsing the child cells in the first report based on the information by preventing the child cells associated with the parent cells from being displayed in the first report without disrupting the layout of data in areas of the spreadsheet external to the first report; and
  collapsing the parent member in the at least one other report when it is determined that the at least one other report is linked to the parent member in the first report.

16. The system of claim 15, wherein retrieving information related to the parent cell further comprises scanning the spreadsheet for at least one of: cross-join information associated with the first report; data cells that are dependent on the parent cell; a number of child cells associated with the parent cell, or a dimension of the first report created by the parent cell and the associated child cells.

17. The system of claim 15, wherein collapsing the child cells comprises removing a row containing a child cell from the spreadsheet.

18. The system of claim 15, wherein collapsing the child cells
 comprises at least one of: removing a row containing a child cell from the first report, moving a row containing a sibling cell to be proximate a row containing the parent cell, removing a column containing a child cell from the spreadsheet; removing a column containing a child cell from the first report, or moving a column containing a sibling cell to be proximate a column containing the parent cell.

19. The system of claim 15, wherein scanning the spreadsheet for information further comprises scanning the spreadsheet for cross-join information associated with the first report.

20. The system of claim 15, wherein the first report is a cross-joined report that assembles data from a plurality of sources.

\* \* \* \* \*